United States Patent
Schmitt et al.

(10) Patent No.: US 6,456,924 B1
(45) Date of Patent: Sep. 24, 2002

(54) METHOD AND DEVICE FOR CONTROLLING THE SLIPPAGE OF A VEHICLE WHEEL

(75) Inventors: Johannes Schmitt, Markgroeningen; Thomas Sauter, Remseck; Andreas Zoebele, Markgroeningen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/616,246

(22) Filed: Jul. 14, 2000

(30) Foreign Application Priority Data

Jul. 15, 1999 (DE) .......................... 199 33 084

(51) Int. Cl.$^7$ ................................ B60T 7/12
(52) U.S. Cl. ................ 701/82; 701/71; 701/72; 701/74; 180/197
(58) Field of Search ............. 701/70, 71, 72, 701/74, 78, 82, 83, 89, 91; 180/197

(56) References Cited

U.S. PATENT DOCUMENTS

| | | | | |
|---|---|---|---|---|
| 4,768,608 A | * | 9/1988 | Hrovat | 180/197 |
| 5,107,429 A | * | 4/1992 | Sol | 701/51 |
| 5,454,630 A | * | 10/1995 | Zhang | 303/175 |
| 5,857,754 A | * | 1/1999 | Fukami et al. | 303/146 |
| 6,199,001 B1 | * | 3/2001 | Ohta et al. | 701/51 |

FOREIGN PATENT DOCUMENTS

DE 44 30 108 2/1996

* cited by examiner

*Primary Examiner*—Gertrude Arthur
(74) *Attorney, Agent, or Firm*—Kenyon & Kenyon

(57) ABSTRACT

A method and a device for controlling slippage of a vehicle wheel are proposed. A traction controller, which intervenes in a drive torque of a drive unit of the vehicle in response to incipient slippage at at least one driven wheel, is provided. Moreover, it is ascertained whether the vehicle is located in an exit area of a curve. If this is the case, the traction controller is influenced so that improved traction of the vehicle results as compared to cornering designed for stability. Furthermore, at least one quantity determining the intervention is modified in response to cornering or straight-ahead driving.

11 Claims, 4 Drawing Sheets

METHOD AND DEVICE FOR CONTROLLING THE SLIPPAGE OF A VEHICLE WHEEL

FIELD OF THE INVENTION

The present invention relates to a method and a device for controlling the slippage of a vehicle wheel.

BACKGROUND INFORMATION

A method and a device for controlling the slippage of a vehicle wheel are described in German Patent No. 44 30 108. The wheel-slip control system described in German Patent No. 44 30 108 reduces the drive torque of a drive unit of the vehicle by a predefined amount in response to incipient slippage at least at one of the driven wheels. In the determination of the magnitude of the drive torque reduction, in addition to the coefficient of friction, the driving situation, for example, whether the vehicle is driving straight ahead, cornering, or entering a curve, is taken into account. In this context, the magnitude of the drive torque reduction is selected such that, given a constant coefficient of friction, the magnitude of the reduction is smallest during straight-ahead driving and greatest during cornering, whereas the magnitude of the reduction lies between these two magnitudes while entering a curve. Moreover, the lower the coefficient of friction, the greater the drive torque reduction is selected to be. By these measures, the stability of the vehicle is improved as a function of the curve condition, as well as while entering a curve, and during cornering. In this context, only the magnitude of the drive torque reduction is emphasized while the response characteristic of the traction controller is independent of the driving situation.

SUMMARY OF THE INVENTION

An object of the present invention is to specify measures by which a wheel-slip controller is adapted to different driving situations.

By recognizing a curve exit and making allowance for it during the control, it is made possible for the slip controller to be influenced in the direction of improved traction during curve exiting. In this manner, a traction gap on the curve exit felt unpleasantly by the driver is effectively prevented. The vehicle behavior during an entire cornering event is improved since the controller is optimized for stability during curve entry and during cornering while being optimized for improved traction during curve exiting.

It is particularly advantageous for the controller to be influenced by varying the slip thresholds. The slip thresholds, for improving the stability, are markedly reduced at the curve entry compared to the slip thresholds during straight-ahead driving; increased during cornering; and further increased during curve exiting in the direction of the slip thresholds during straight-ahead driving. Thus, in the curve section endangering the stability, a more sensitive response characteristic is ensured that improves the vehicle's stability.

If, additionally, the drive torque of the drive unit is influenced as a function of the a curve condition, a harmonic control response is achieved over the whole curve range, and stability and traction are optimized. It is a particular advantage that, besides or in lieu of the threshold variation, the drive torque control is modulated as a function of the curve area. In this context, the correction steps for the drive torque (in the reducing or increasing direction) and/or the controller dynamics are influenced as a function of curve entry or curve exit, for example, by making the reducing torque correction steps greater and the reduction faster on the curve entry while the increase in torque is slower and the steps smaller, respectively, whereas on the curve exit, the reduction is slower, the size of the correction steps is smaller and, during the increase in torque, the steps are greater and, consequently, the engine torque is increased faster.

DETAILED DESCRIPTION

Figure 1:
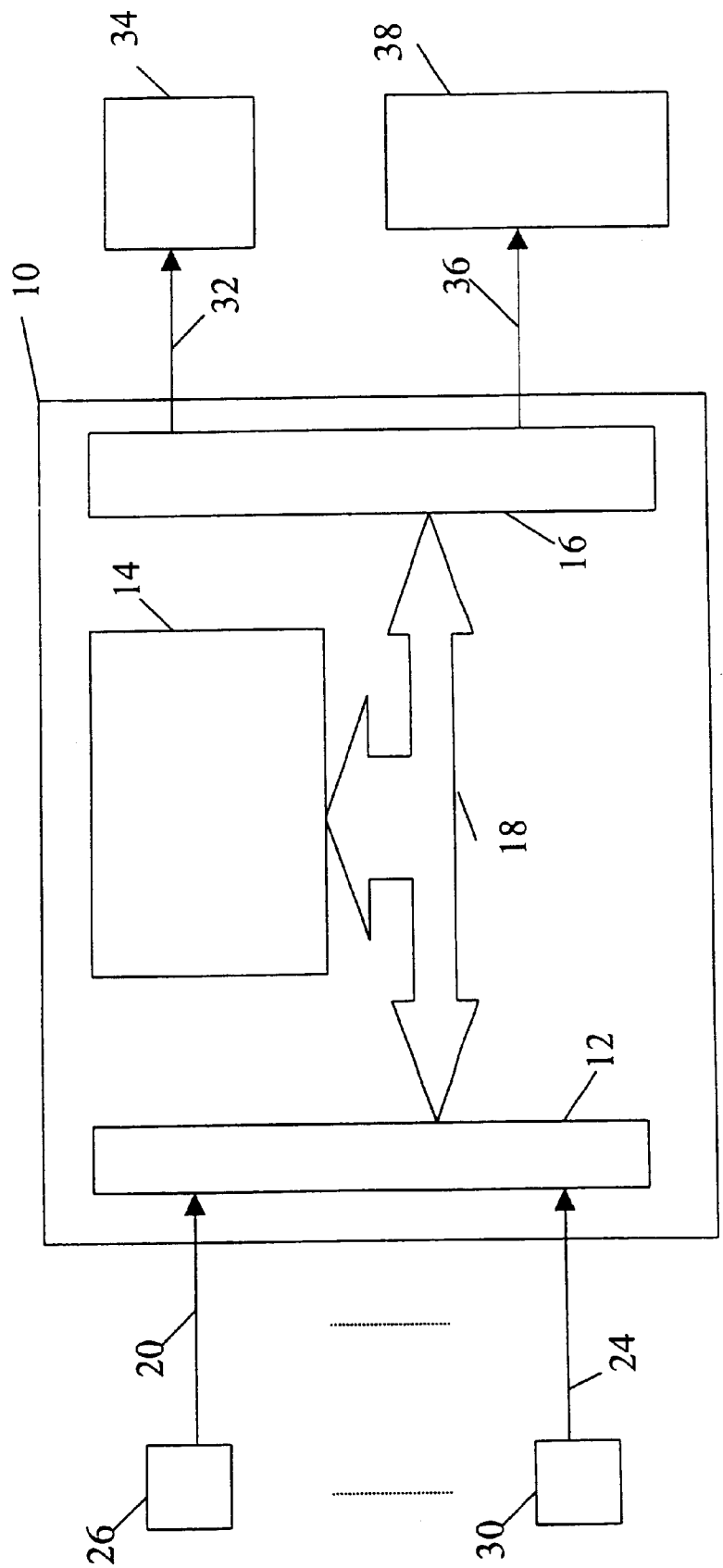
FIG. 1 shows a block diagram of a control device for controlling a wheel slip of a vehicle.

FIG. 1 shows a control device 10 that includes at least one input circuit 12, at least one microcomputer 14, and at least one output circuit 16. These elements are interconnected by a communication system 18 for mutually exchanging data. Fed to input circuit 12 are input lines via which signals are supplied that represent performance quantities of the vehicle or from which such performance quantities can be derived. For reasons of clarity, FIG. 1 illustrates only input lines 20–24, which supply signals representing the wheel speeds. These signals are ascertained in measuring devices 26–30. Depending on the exemplary embodiment, further quantities not shown in FIG. 1 are supplied. These quantities include, for example, a signal representing the vehicular speed as well as signals representing the braking forces, braking torques, or braking pressures acting at each wheel. Via output circuit 16 and the output lines connected thereto, control unit 10 delivers manipulated variables within the scope of the controls carried out by it. At least one output line 32 leads to at least one final control element 34 for influencing an output quantity (power output, torque, speed) of the drive unit of the vehicle. This final control element 34 is a motor control device, in the exemplary embodiment of an internal combustion engine, for example, a control device for actuating a throttle-valve which can be actuated electrically. Moreover, braking system 38 of the vehicle is actuated via at least one output line 36. Depending on the exemplary embodiment, the braking system is a hydraulic, a pneumatic, or an electromotive braking system. For performing the traction control, the braking systems have circuit elements that allow the braking force to be built up at the wheel via the braking force input by the driver by actuating the brake pedal. In addition, the transverse acceleration of the vehicle, the yaw rate of the vehicle, and/or the steering angle are ascertained by corresponding measuring devices, depending on the exemplary embodiment. In other exemplary embodiments, these quantities are derived from other performance quantities, for example, the transverse acceleration from the vehicular speed and wheel speeds.

In the scope of the wheel-slip control, a traction controller, in response to incipient slippage at least at one driven wheel, reduces an output quantity (e.g., drive torque) of the drive unit of the vehicle to a value which corresponds essentially to the transmittable torque. After the incipient slippage has been reduced in this manner, the drive torque is increased again at a specific gradient to the value desired by the driver. Besides this drive intervention, in some exemplary embodiments, a brake intervention is performed at the spinning wheel. The brake intervention supports the action of the traction controller. During cornering, as described in German Patent No. 44 30 108, the coefficient of friction of the roadway is taken into account, as well. This results in that during cornering on a low coefficient of friction, the output quantity is modulated differently than during cornering on a high coefficient of friction. In the case of low-$\mu$ corners, the magnitude of the reduction is greater than in the case of high-$\mu$ corners, whereas it is generally vice versa for the speed at which the output quantity is increased. Besides the estimation of the coefficient of friction performed in German Patent No. 44 30 108, in other exemplary embodiments, this curve condition is determined on the basis of the vehicular speed, and the transverse acceleration calculated from the vehicular speed and the speed difference of the wheels of the non-driven axle. For example, in the case of low vehicular speed and high transverse acceleration, a low-$\mu$ curve is assumed whereas with a given speed, a given speed difference and low transverse acceleration, a high-$\mu$ curve is assumed.

Curve entry and curve exit are ascertained additionally or alternatively to this curve condition recognition and to making allowance for it during the drive control. This is performed by differentiating the transverse acceleration or similar quantities that vary during cornering, such as wheel speed difference of the wheels of the non-drive axle, yaw rate quantities or steering angle quantities. A cornering event exists when this quantity exceeds a limiting value. A curve entry is recognized when the change of this quantity exceeds a predefined limiting value. If, subsequent to such a curve entry, the limiting value of the quantity fails to be met again, and the quantity itself is at the same time greater than a limiting value, then a cornering event is assumed to be at the curve vertex. If the change of the quantity fails to meet a predefined limiting value, a curve exit is inferred. In this context, the limiting value for the change of the quantity for recognizing the curve entry is positive, and the limiting value for recognizing the curve exit is negative. In the exemplary embodiment, the two values are equal in terms of the amount, in other exemplary embodiments they are different. Evaluated as quantity is the transverse acceleration, the speed difference, the yaw rate, or the steering angle, depending on the exemplary embodiment.

The information on the respective cornering phase is used for influencing the drive control. In this context, different procedures are available that can be used separately or in an arbitrary combination, depending on the design.

The first group of measures concerns the sensitivity of the activation of the traction controller or the sensitivity of the initial control response of the vehicle. The sooner the drive torque is reduced in response to incipient slippage of a driven wheel, the higher the stability of the vehicle behavior. Therefore, the slip thresholds, which trigger the activation of the traction controller, and which, when being exceeded by the drive-wheel slip, cause the torque to be reduced, are lowered in the curve compared to those valid for straight-ahead driving. In comparison with this lowered value, the slip thresholds are further reduced at the curve entry for further increasing the stability of the vehicle behavior. In contrast to this, the opposite way is pursued at the curve exit. There, for improving the traction, the slip thresholds are raised as compared to the slip thresholds selected during cornering. A slip threshold, which lies between the values selected during cornering and those selected during straight-ahead driving, is selected.

A second group of measures concerns the torque control as such. In this context, the intended torque change values and/or the controller dynamics are influenced as a function of the cornering area. In particular, greater torque correction steps in the reducing direction on the curve entry and smaller ones in the increasing direction are provided than is the case during straight-ahead driving and during cornering. With respect to the dynamics (e.g., by different selection of the controller constants) the influencing is such that on the curve entry a faster reduction and a slower torque increase take place compared to straight-ahead driving and cornering. On the curve exit, where an improved traction of the vehicle is desired while dispensing with a stability reserve, a smaller reduction of the engine torque is performed in response to the incipient slippage. The reduction is smaller than the reduction during cornering, whereas the torque change during torque increase is greater. Accordingly, the method according to the present invention shows a slower reduction of the engine torque in response to incipient slippage on the curve exit whereas the engine torque is increased faster in response to the disappearance of the incipient slippage, in each case related to the usual values during cornering.

As a rule, the indicated parameters are modified in the direction of stability (smaller slip threshold, etc.) in the case of a curve having low $\mu$, and in the direction of traction (higher slip threshold) in the case of high $\mu$.

In the exemplary embodiment, the method according to the present invention is implemented as a program of computing device 14. Such a program is illustrated using the flow charts shown in FIGS. 2 and 3.

Figure 2:
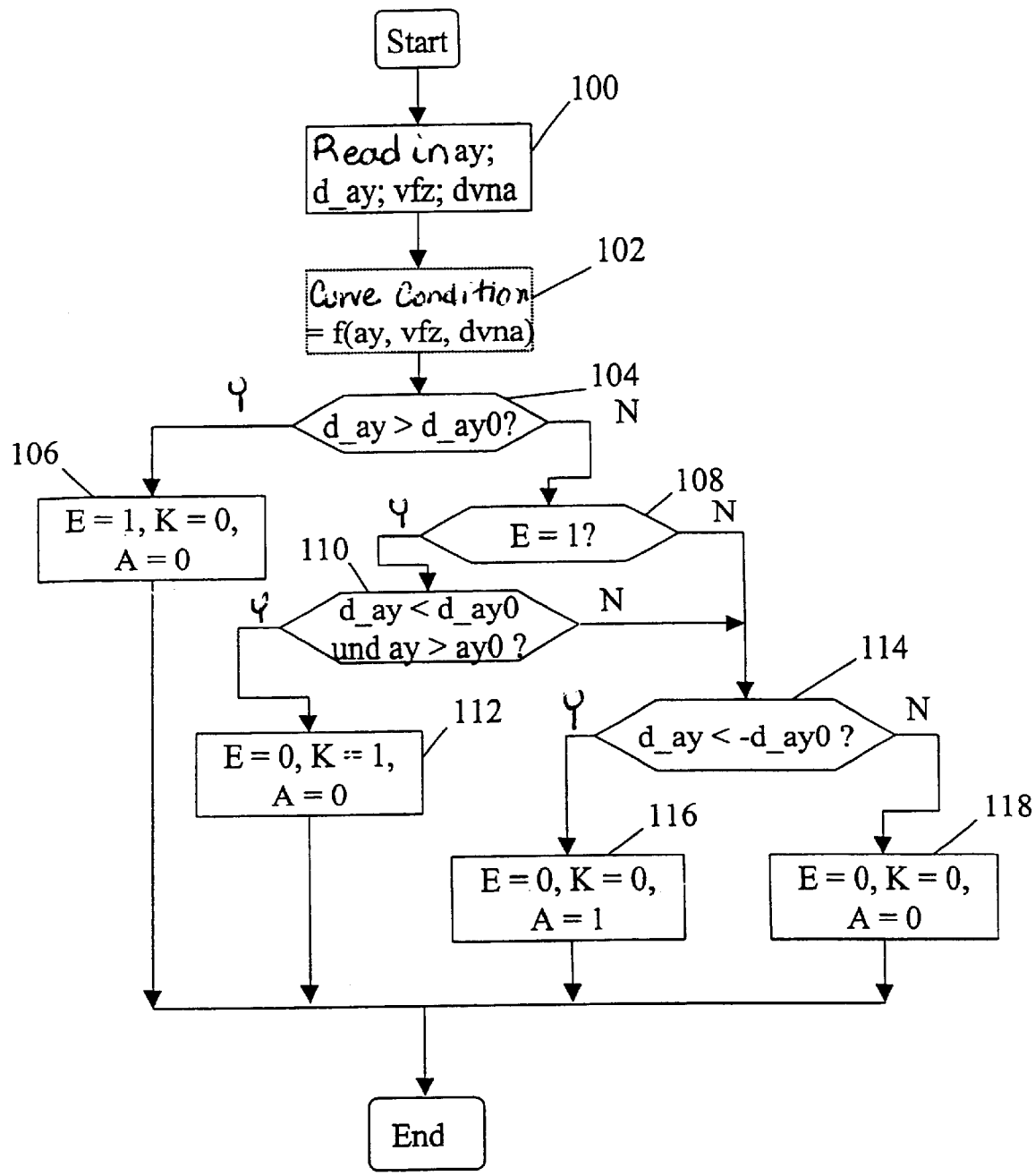
FIG. 2 shows a first flow chart of an implementation of a controller as program of a microcomputer.

The program of FIG. 2 used for determining the curve situation is executed at predefined instants. In first step 100, the transverse acceleration of the vehicle is read in. The transverse acceleration is either measured or calculated on the basis of vehicular speed and wheel-speed difference of the wheels of the non-drive axle. In step 100, the change in transverse acceleration d_ay, vehicular speed vfz, which is measured or estimated, and speed difference dvna of the wheels of the non-drive axle are read in. In optional step 102, the curve condition is determined on the basis of transverse acceleration, vehicular speed and wheel-speed difference, as described above. Thereupon, it is checked in step 104 whether the change in the transverse acceleration is greater than a predefined limiting value d_ay0. If this is the case, the it is assumed according to step 106 that the vehicle is on the curve entry. Mark E is correspondingly set to 1 whereas further marks K and A, which designate cornering and the curve exit, respectively, remain at zero. Subsequently, the program is terminated and repeated at the next instant. If step 104 revealed that the change in the transverse acceleration does not exceed the limiting value, it is checked in step 108 whether mark E is set to 1, i.e., whether the vehicle has last been located in the area of entering the curve. If this is the case, it is checked in step 110 whether the change in the transverse acceleration is smaller than the limiting value checked in step 104, which, in the case of a no-answer in step 104, is inevitably the case, and whether transverse acceleration ay is greater than a predefined limiting value ay0. If this is the case, it is assumed that vehicle is cornering. Accordingly, marks E and A are zero whereas mark K indicating cornering is set to value 1. Subsequent to step 112, the program is terminated and repeated at the next instant. If step 108 or step 110 have yielded a no-answer, then it is checked in step 114 whether the change in the transverse acceleration undershoots a predefined limiting value, for example the negative limiting value known from step 104. If this is the case, the vehicle is located in the curve exit area so that, according to step 116, marks E and K are zero, whereas mark A characterizing the area of exiting the curve is set to value 1. If the limiting value is not undershot, then it is assumed according to step 118 that the vehicle is driving straight ahead so that all marks have value 0.

Figure 3:
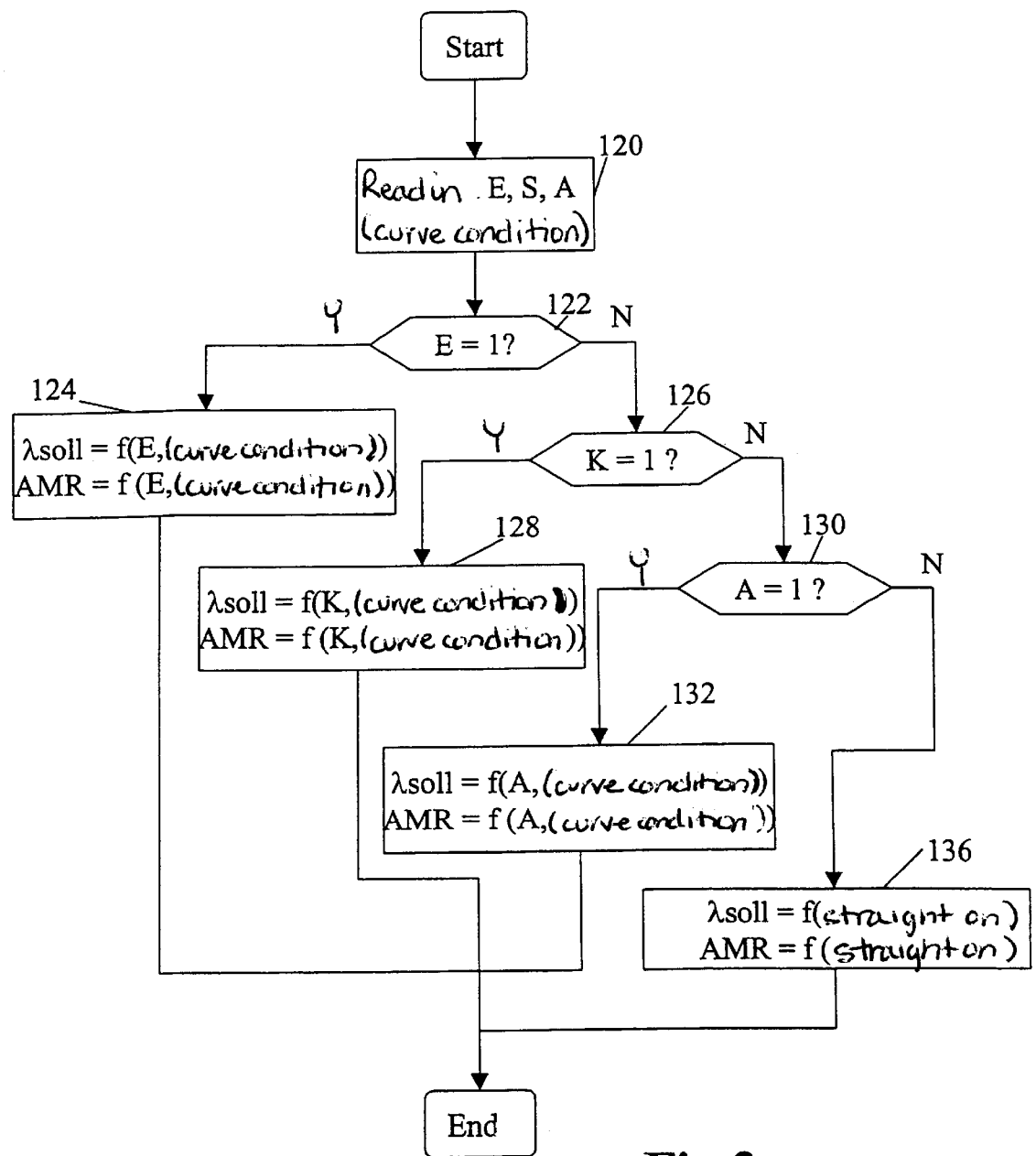
FIG. 3 shows a second flow chart of an implementation of a controller as a program of a microcomputer.
Figure 4A:
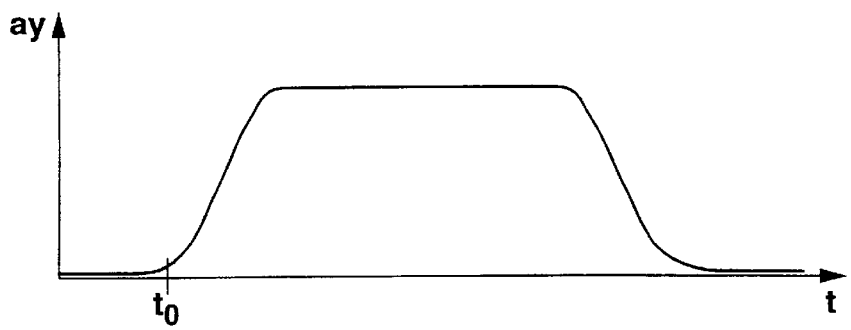
FIG. 4a shows a timing diagram of a transverse acceleration.
Figure 4B:
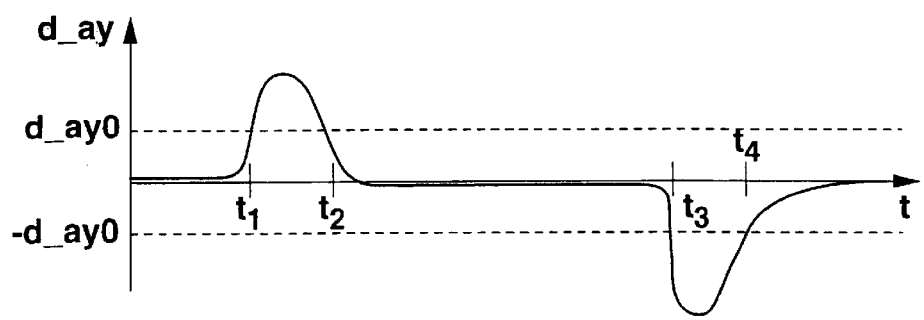
FIG. 4b shows a timing diagram of a differentiated transverse acceleration.
Figure 4C:
FIG. 4c shows a timing diagram of a first mark.
Figure 4D:
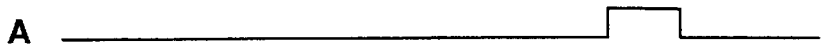
FIG. 4d shows a timing diagram of a second mark.
Figure 4E:
FIG. 4e shows a timing diagram of a third mark.
Figure 4F:
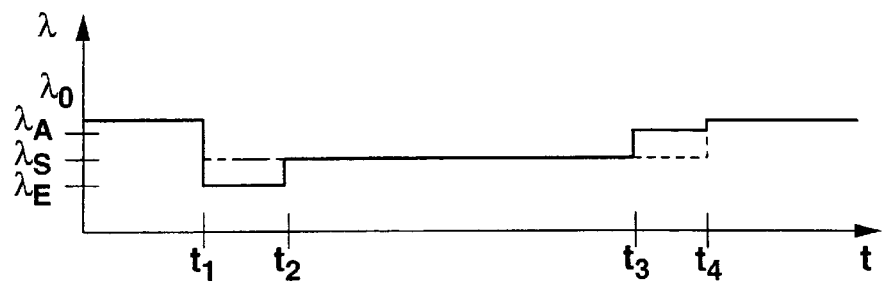
FIG. 4f shows a timing diagram of a slip threshold value.

The program shown in FIG. 3, which is also executed at predefined instants, describes the utilization of the information gained with the assistance of the program according to FIG. 2. Subsequent to the start of the program, marks E, K, and A, and, possibly, the curve condition determined in step 102 are read in step 120. Thereupon, it is checked in step 122 whether mark E is set, i.e., whether the vehicle is located in the curve entry area. If this is the case, slip-threshold value $\lambda$soll and/or drive torque modulation AMR are influenced, according to step 124, as specified above as a function of the curve area and, possibly, of the curve condition. If mark E is not set, it is checked in step 126 whether mark K is set. If this is the case, then slip threshold value $\lambda$soll and drive torque modulation AMR are modified, according to step 128, as specified above in a manner corresponding to the prevailing curve area and, possibly, to the curve condition. If the answer in step 126 is no, then it is checked in step 130 whether mark A is set to value 1. If this is the case, slip-threshold value and/or torque modulation AMR are influenced in step 132 as specified above in a manner corresponding to the curve area and, possibly, to the curve condition. If the answer in step 130 is no, then the vehicle is driving straight ahead. The slip value and/or the torque modulation correspond to the values for straight-ahead driving again.

In FIG. 4, the procedure described above is illustrated on the basis of a typical cornering event, using timing diagrams. FIG. 4a describes the variation with time of transverse acceleration ay; FIG. 4b depicts that of differentiated transverse acceleration d_ay. Graphically illustrated in FIGS. 4c–4e are the variations over time of marks E, K, and A whereas FIG. 4f depicts the variation over time of the slip-threshold value. At instant t0 (cf FIG. 4a), the vehicle is entering a curve so that transverse acceleration ay increases. In this area, the slip-threshold value is at value $\lambda$0 applying to straight-ahead driving. At instant t1, the change in the transverse acceleration exceeds the predefined limiting value (cf FIG. 4b) so that mark E is set. The vehicle is on the curve entry so that from instant t1, the slip-threshold value is reduced to value $\lambda$E predefined for this area. At instant t2, the change in the transverse acceleration undershoots the limiting value again as illustrated in FIG. 4b so that mark E is reset, and mark K is set because the transverse acceleration itself exceeds a limiting value. This means that from instant t2, the vehicle is cornering so that from instant t2, the slip-threshold value is set to value $\lambda$S applying to cornering. At instant t3, the change in the transverse acceleration undershoots the negative limiting value (cf FIG. 4b), which is exceeded again at instant t4. This means that the vehicle is located in the area of exiting the curve so that mark K is reset, and mark A is set during the time interval between t3 and t4. According to FIG. 4f, the slip-threshold value, during this time interval, is correspondingly set to value $\lambda$A applying to the curve exit. From instant t4, the transverse acceleration has fallen below the limiting value so that straight-ahead driving is recognized. From instant t4, therefore, all marks are set to zero so that value $\lambda$0, which applies to straight-ahead driving, is selected as slip-threshold value again.

In other exemplary embodiments, besides evaluating the transverse acceleration, other quantities indicating cornering, such as the value of the speed difference of the non-driven wheels, a yaw-rate quantity, or a steering-angle quantity, are correspondingly evaluated.

What is claimed is:

1. A method for controlling slippage of a wheel of a vehicle, comprising the steps of:
    in response to incipient slippage at at least one driven wheel, reducing at least one output quantity of a drive unit of the vehicle at least as a function of whether the vehicle is one of cornering and driving straight ahead; and
    determining whether the vehicle is located in an exit area of a curve, the reduction in the at least one output quantity being modified to improve traction of the vehicle when the vehicle is located in the exit area of the curve.

2. A method according to claim 1, comprising the steps of:
    modifying at least one slip threshold as a function of whether the vehicle is cornering, the at least one slip threshold activating a traction controller; and
    modifying at least one of:
        at least one of a magnitude of the at least one output quantity and a speed of the reduction in the at least one output quantity,
        at least one of the magnitude of the at least one output quantity and a speed of an increase in the at least one output quantity.

3. The method according to claim 1, further comprising the steps of:
    determining whether the vehicle is located in an entry area the curve; and
    performing the reduction in the at least one output quantity of the vehicle to improve stability of the vehicle when the vehicle is located in the entry area of the curve.

4. The method according to claim 1, further comprising the steps of:
    during cornering as compared to straight-ahead driving, reducing a slip-threshold value for detecting the incipient slippage and for activating a drive torque intervention;
    in an entry area of the curve as compared to normal cornering, reducing the slip-threshold value; and
    in the exit are of the curve as compared to normal cornering, increasing the slip-threshold.

5. The method according to claim 1, further comprising the steps of:
    detecting a signal indicating cornering; and
    as a function of a change in the signal, determining whether the vehicle is one of located in an entry area of the curve, located in the exit area of the curve, and cornering.

6. The method according to claim 5, wherein:
    the signal is one of a transverse acceleration of the vehicle, a steering angle, a yaw rate, or a difference between the speeds of the wheels of a non-drive axle of the vehicle.

7. The method according to claim 1, further comprising the step of:
    estimating a coefficient of friction in the curve, a drive control being dependent on the coefficient of friction.

8. The method according to claim 1, further comprising the steps of:
- recognizing an entry area of the curve when a change of a signal representing cornering is less than a first predefined limiting value;
- subsequent to the step of recognizing the entry area of the curve, recognizing cornering when the signal exceeds a limiting value;
- recognizing the exit area of the curve when the change of the signal is less than a second predefined limiting value.

9. A device for controlling slippage of a wheel of a vehicle, comprising:
- a control device including at least one microcomputer, the at least one microcomputer receiving at least one input quantity and transmitting at least one output quantity for controlling an output quantity of a drive unit of the vehicle, the microcomputer including at least one traction controller influencing the output quantity of the drive unit in response to incipient slippage of at least one driven wheel, the at least one traction controller including a recognition device for recognizing when the vehicle is located in an entry area of a curve, an intervention in the output quantity of the drive unit being modified in response to a recognized exit area of the curve to improve traction of the vehicle.

10. The device according to claim wherein:
- the recognition device recognizes whether the vehicle is cornering;
- the recognition device changes at least one slip threshold value, the at least one slip threshold value activating the at least one traction controller; and
- the recognition device changes at least one of:
  - at least one of a magnitude of the output quantity of the drive unit and a speed of a decrease in the output quantity, and
  - the magnitude of the output quantity of the drive unit and a speed of an increase in the output quantity of the drive unit.

11. A method for controlling slippage of a wheel of a vehicle, comprising the steps of:
- in response to incipient slippage at at least one driven wheel, reducing at least one output quantity of a drive unit of the vehicle at least as a function of whether the vehicle is one of cornering and driving straight ahead;
- determining whether the vehicle is located in an exit area of a curve, the reduction in the at least one output quantity being modified to improve traction of the vehicle when the vehicle is located in the exit area of the curve;
- in an entry area of the curve as compared to straight-ahead driving and cornering:
  - in response to the incipient slippage in an entry area of the curve, selecting at least one of a faster reduction of the at least one output quantity and a greater correction step of the at least one output quantity;
  - in response to a disappearance of the incipient slippage, performing at least one of a slower increase of the at least one output quantity and a smaller correction step of the at least one output quantity; and in the exit area of the curve as compared to straight-ahead driving and cornering:
  - in response to the incipient slippage of at least one driven wheel, performing at least one of a slower reduction of the at least one output quantity and a smaller correction step of the at least one output quantity; and
- in response to the disappearance of the incipient slippage, performing a faster increase in the at least one output quantity and a greater correction step of the at least one output quantity.

* * * * *